United States Patent
Lima et al.

(10) Patent No.: US 9,650,502 B2
(45) Date of Patent: May 16, 2017

(54) PROCESS FOR THE PREPARATION OF NITRILE RUBBERS

(75) Inventors: Romano Lima, Russi (IT); Davide Santi, Ravenna (IT)

(73) Assignee: Versalis S.P.A. (IT)

( * ) Notice: Subject to any disclaimer, the term of this patent is extended or adjusted under 35 U.S.C. 154(b) by 333 days.

(21) Appl. No.: 14/127,831

(22) PCT Filed: Jun. 26, 2012

(86) PCT No.: PCT/EP2012/062311
§ 371 (c)(1),
(2), (4) Date: Dec. 19, 2013

(87) PCT Pub. No.: WO2013/000890
PCT Pub. Date: Jan. 3, 2013

(65) Prior Publication Data
US 2014/0124986 A1    May 8, 2014

(30) Foreign Application Priority Data

Jun. 27, 2011    (IT) ............... MI2011A1170

(51) Int. Cl.
| | | |
|---|---|---|
| *C08L 9/02* | (2006.01) | |
| *C08C 1/14* | (2006.01) | |
| *B29C 45/00* | (2006.01) | |
| *C08F 2/22* | (2006.01) | |
| *C08F 236/12* | (2006.01) | |
| *C08C 1/15* | (2006.01) | |
| *C08C 3/02* | (2006.01) | |

(52) U.S. Cl.
CPC ............ *C08L 9/02* (2013.01); *B29C 45/0001* (2013.01); *C08C 1/14* (2013.01); *C08C 1/15* (2013.01); *C08C 3/02* (2013.01); *C08F 2/22* (2013.01); *C08F 236/12* (2013.01)

(58) Field of Classification Search
CPC ......... B29C 45/0001; C08C 1/14; C08C 1/15; C08C 3/02; C08F 2/22; C08F 236/12; C08L 9/02
USPC .......................................... 526/297; 524/565
See application file for complete search history.

(56) References Cited

U.S. PATENT DOCUMENTS

| | | | |
|---|---|---|---|
| 5,651,995 A | 7/1997 | Oyama et al. | |
| 5,703,189 A | 12/1997 | Tsuji et al. | |
| 7,923,518 B2 * | 4/2011 | Obrecht | .............. C08C 1/14 523/335 |
| 2008/0293889 A1 * | 11/2008 | Obrecht | .............. C08C 1/14 525/233 |
| 2011/0123748 A1 | 5/2011 | Obrecht | |
| 2011/0190441 A1 * | 8/2011 | Brandau | .............. C08C 19/02 524/565 |

FOREIGN PATENT DOCUMENTS

| | | | | |
|---|---|---|---|---|
| EP | 2316860 | * | 5/2011 | ......... C08C 19/02 |
| EP | 2316860 A1 | | 5/2011 | |

* cited by examiner

*Primary Examiner* — Ling Choi
*Assistant Examiner* — Chun-Cheng Wang
(74) *Attorney, Agent, or Firm* — Tarolli, Sundheim, Covell & Tummino LLP

(57) ABSTRACT

Process for the preparation of a nitrile rubber comprising: —subjecting at least one $\alpha,\beta$-unsaturated nitrile, at least one conjugated diene and, optionally, one or more further copolymerizable monomers, to emulsion polymerization, in the presence of at least one alkyl thiol containing from 12 to 16 carbon atoms and at least three tertiary carbon atoms and having the sulfur bound to one of said tertiary carbon atoms, at a pH ranging from 7 to 10, preferably from 8 to 9, obtaining a latex; —subjecting said latex to coagulation, in the presence of at least one metal sulfate selected from magnesium, sodium, potassium, preferably magnesium, at a temperature higher than or equal to 30° C., preferably ranging from 40° C. to 60° C., obtaining a coagulated nitrile rubber: —subjecting said coagulated nitrile rubber to washing with water, in the presence of at least one inorganic base, selected from sodium hydroxide, potassium hydroxide, calcium hydroxide, magnesium hydroxide, lithium hydroxide, preferably potassium hydroxide, at a pH higher than or equal to 10, preferably ranging from 11 to 12. The nitrile rubber thus obtained is capable of giving vulcanizable elastomeric compositions having a high vulcanization rate and a good vulcanization yield. Furthermore, said elastomeric compositions cause a low fouling of the molds and can consequently be advantageously used in injection molding processes.

20 Claims, No Drawings

PROCESS FOR THE PREPARATION OF NITRILE RUBBERS

The present invention relates to a process for the preparation of a nitrile rubber.

More specifically, the present invention relates to a process for the preparation of a nitrile rubber comprising the emulsion polymerization of at least one $\alpha,\beta$-unsaturated nitrile, of at least one conjugated diene and, optionally, of one or more further copolymerizable monomers, obtaining a latex; the coagulation of said latex in the presence of at least one metal sulfate obtaining a coagulated nitrile rubber; the washing of said coagulated nitrile rubber with water in the presence of at least one inorganic base.

The present invention also relates to a vulcanizable elastomeric composition comprising at least one nitrile rubber obtained as described above.

The nitrile rubber thus obtained is capable of giving vulcanizable elastomeric compositions having a high vulcanization rate and a good vulcanization yield. Furthermore, said elastomeric compositions cause a low fouling of the moulds and, consequently, can advantageously be used in injection moulding processes.

It is known that nitrile rubbers, in particular acrylonitrile-butadiene rubbers (also known as NBR) are widely used in injection moulding.

For injection moulding, nitrile rubbers must generally be capable of giving elastomeric compositions having a high fluidity, a high crosslinking efficiency (i.e. a high vulcanization rate), in particular at a high temperature, and a short vulcanization time.

Various processes have been proposed for obtaining nitrile rubbers capable of giving elastomeric compositions having a high vulcanization rate such as, for example, a process for introducing functional groups such as, for example, carboxyl groups or amino groups; a process for incorporating suitable vulcanization promoters; a process for carrying out emulsion polymerization using minimum quantities of an emulsifying agent and of a coagulant thus minimizing the quantity of residual catalyst in the nitrile rubbers obtained.

Furthermore, the contamination of the moulds is evident in the injection moulding of elastomeric compositions comprising nitrile rubbers in which the vulcanization is carried out at a high temperature. When the moulding is repeated for various cycles, in fact, residues of the material used are gradually deposited in the moulds with a consequent contamination of the moulded articles obtained and deterioration of their surface. The moulds must therefore be cleaned periodically with time losses, higher production costs and a reduced productivity.

Efforts have been made in the art for overcoming the above drawbacks.

European patent application EP 692 496, for example, describes an unsaturated nitrile/conjugated diene copolymer having a Mooney viscosity ranging from 15 to 65 and containing at least 0.03 moles per 100 moles of monomeric units forming the molecule, of an alkylthio group having from 12 to 16 carbon atoms containing at least three tertiary carbon atoms and having the sulfur bound to one of said tertiary carbon atoms. Said patent application also describes a process for the preparation of said copolymer characterized by copolymerizing an unsaturated nitrile with a conjugated diene in the presence of a free-radical initiator using, as molecular weight modifier, an alkyl thiol having from 12 to 16 carbon atoms containing at least three tertiary carbon atoms and having the sulfur bound to one of said tertiary carbon atoms. The above copolymer is said to be capable of giving elastomeric compositions having a high vulcanization rate when vulcanized at a high temperature and for a short period of time and which are capable of substantially solving the problem of the fouling of the moulds. The above copolymer is consequently said to be capable of giving elastomeric compositions which are particularly useful in injection moulding.

European patent application EP 779 300 describes an unsaturated nitrile/conjugated diene copolymer having at least 0.03 moles per 100 moles of monomeric units forming the molecule, of an alkylthio group having from 12 to 16 carbon atoms containing at least three tertiary carbon atoms and having the sulfur bound to one of said tertiary carbon atoms, said copolymer having a Mooney viscosity ranging from 15 to 150 and a content of unsaturated nitrile ranging from 10% by weight to 60% by weight, and a breadth of compositional distribution ($\Delta AN$) of the unsaturated nitrile in said copolymer ranging from 3 to 20. Said patent application also describes a process for the preparation of said copolymer in which an unsaturated nitrile and a conjugated diene are copolymerized in the presence of a molecular weight modifier and of a free-radical initiator, characterized in that the molecular weight modifier is an alkyl thiol having from 12 to 16 carbon atoms containing at least three tertiary carbon atoms and having the sulfur bound to one of said tertiary carbon atoms and also in that the copolymerization is initiated with a quantity ranging from 30% by weight to 80% by weight of the total quantity of monomers and, when the polymerization conversion reaches a value ranging from 20% to 70%, the remaining quantity of monomers is incorporated in the polymerization mixture. The above copolymer is said to be capable of giving elastomeric compositions having a high vulcanization rate when vulcanized at a high temperature and for a short time and which are capable of substantially solving the problem of the fouling of the moulds. The above copolymer is consequently said to be capable of giving elastomeric compositions which are particularly useful in injection moulding.

European patent application EP 779 301 describes an unsaturated nitrile/conjugated diene copolymer having at least 0.03 moles per 100 moles of monomeric units forming the molecule, of an alkylthio group having from 12 to 16 carbon atoms containing at least three tertiary carbon atoms and having the sulfur bound to one of said tertiary carbon atoms, said copolymer having a Mooney viscosity ranging from 15 to 150 and containing from 3% by weight to 20% by weight of a low-molecular-weight fraction having a number average molecular weight not higher than 35,000. Said patent application also describes a process for the preparation of said copolymer wherein an unsaturated nitrile and a conjugated diene are copolymerized in the presence of a molecular weight modifier and of a free-radical initiator characterized in that the molecular weight modifier is an alkyl thiol having from 12 to 16 carbon atoms containing at least three tertiary carbon atoms and having the sulfur bound to one of said tertiary carbon atoms and also in that a quantity ranging from 10% by weight to 95% by weight of the total quantity of molecular weight modifier is incorporated in the mixture of monomers before initiating the copolymerization and, when the polymerization conversion reaches a value ranging from 20% to 70%, the remaining quantity of molecular weight modifier is incorporated in the polymerization mixture. The above copolymer is said to be capable of giving elastomeric compositions having a high vulcanization rate when vulcanized at a high temperature and for a short time and which are capable of substantially solving the problem of the fouling of the moulds. The above copolymer is consequently said to be capable of giving elastomeric compositions which are particularly useful in injection moulding.

In the above documents, however, as a demonstration of the high vulcanization rate of the elastomeric compositions comprising said nitrile rubbers, a short initial vulcanization time (scorch time) is indicated. Said short initial vulcanization time (scorch time), however, can have various drawbacks, in particular with respect to the use of said elastomeric compositions in injection moulding.

Efforts have been made in the art for overcoming the above drawbacks.

American patent application US 2008/02893868, for example, describes a nitrile rubber comprising repetitive units of at least one α,β-unsaturated nitrile, at least one conjugated diene and, optionally, one or more further copolymerizable monomers having an ion index ("II") in accordance with the following general formula (I) within the range of 0 ppm×g/mole to 60 ppm×g/mole:

$$II = 3\left[\frac{c(Ca^{2+})}{40 \text{ g/ml}} + \frac{c(Mg^{2+})}{24 \text{ g/ml}}\right] - \left[\frac{c(Na^+)}{23 \text{ g/ml}} + \frac{c(K^+)}{39 \text{ g/ml}}\right] \quad (I)$$

wherein $c(Ca^{2+})$, $c(Mg^{2+})$, $c(Na^+)$, and $c(K^+)$, indicate the concentrations of the calcium, magnesium, sodium and potassium ions in the nitrile rubber in ppm and the concentration of the magnesium ions $[c(Mg^{2+})]$ ranges from 50 ppm to 250 ppm. Said patent application also describes a process for the preparation of said nitrile rubber which comprises emulsion polymerizing at least one α,β-unsaturated nitrile, at least one conjugated diene and, optionally, one or more further copolymerizable monomers, wherein the latex initially obtained in the polymerization and containing the nitrile rubber is subjected to coagulation and the coagulated nitrile rubber obtained is subsequently subjected to washing, characterized in that:

(i) said emulsion polymerization is carried out in the presence of at least one alkyl thiol containing from 12 to 16 carbon atoms and at least three tertiary carbon atoms and having the sulfur bound to one of said tertiary carbon atoms; and (ii) the pH of the latex obtained from said emulsion polymerization is established at a value of at least 6 before coagulation and the temperature of the latex is established at a value lower than 45° C. before the addition of the magnesium salt.

The above nitrile rubber is said to give vulcanizable elastomeric compositions having high vulcanization rates.

American patent application US 2008/0293889 describes a nitrile rubber comprising repetitive units of at least one α,β-unsaturated nitrile, at least one conjugated diene and, optionally, one or more further copolymerizable monomers having:

(i) a content of calcium ions of at least 150 ppm based on the nitrile rubber and a content of chlorine ions of at least 40 ppm based on the nitrile rubber; and (ii) contains the following terminal groups 2,2,4,6,6-pentamethylheptane-4-thiol and/or 2,4,4,6,6-pentamethylheptane-2-thiol and/or 2,3,4,6,6-pentamethylheptane-2-thiol and/or 2,3,4,6,6-pentamethylheptane-3-thiol.

Said patent application also describes a process for the preparation of said nitrile rubber which comprises emulsion polymerizing at least one α,β-unsaturated nitrile, at least one conjugated diene and, optionally, one or more further copolymerizable monomers, wherein the latex initially obtained in the polymerization and containing nitrile rubber is subjected to coagulation and the coagulated nitrile rubber obtained is subsequently subjected to washing, characterized in that:

(i) said emulsion polymerization is carried out in the presence of a mixture containing 2,2,4,6,6-pentamethylheptane-4-thiol, 2,4,4,6,6-pentamethylheptane-2-thiol, 2,3,4,6,6-pentamethylheptane-2-thiol and 2,3,4,6,6-pentamethylheptane-3-thiol;

(ii) the latex containing the nitrile rubber is subjected to coagulation using at least one salt selected from the group consisting of salts of aluminium, calcium, magnesium, sodium, potassium and lithium;

(iii) the calcium salt soluble in water is present during the coagulation, and/or the washing of the coagulated nitrile rubber that is carried out using water containing calcium ions; and (iv) a chlorine-based salt is present either during the emulsion polymerization, or during the coagulation, or during the subsequent washing of the coagulated nitrile rubber.

The above nitrile rubber is said to have a good stability during storage and at the same time to be capable of giving elastomeric compositions having unchanged processability properties, i.e. a good vulcanization profile.

American patent application US 2008/02893869 describes a nitrile rubber comprising repetitive units of at least one α,β-unsaturated nitrile, at least one conjugated diene and, optionally, one or more further copolymerizable monomers having an ion index ("II") in accordance with the following general formula (I) within the range of 7 ppm×g/mole to 26 ppm×g/mole:

$$II = \frac{3c(Ca^{2+})}{40 \text{ g/ml}} - \left[\frac{c(Na^+)}{23 \text{ g/ml}} + \frac{c(K^+)}{39 \text{ g/ml}}\right] \quad (I)$$

wherein $c(Ca^{2+})$, $c(Na^+)$, and $c(K^+)$, indicate the concentrations of the calcium, sodium and potassium ions in the nitrile rubber in ppm. Said patent application also describes a process for the preparation of said nitrile rubber which comprises emulsion polymerizing at least one α,β-unsaturated nitrile, at least one conjugated diene and, optionally, one or more further copolymerizable monomers, wherein the latex initially obtained in the polymerization and containing the nitrile rubber is subjected to coagulation and the coagulated nitrile rubber obtained is subsequently subjected to washing, characterized in that:

(i) said emulsion polymerization is carried out in the presence of at least one alkyl thiol containing from 12 to 16 carbon atoms and at least three tertiary carbon atoms and having the sulfur bound to one of said tertiary carbon atoms; and (ii) the pH of the latex obtained is established at a value of at least 6 before coagulation and the latex is subsequently coagulated using at least one salt of a monovalent metal, with not more than 5% by weight of a salt of a divalent metal, based on the total quantity of salts used for the coagulation; and (iii) a temperature of at least 50° C. is established both during the coagulation and during the subsequent washing.

The above nitrile rubber is said to be capable of giving vulcanizable elastomeric compositions having high vulcanization rates.

The study of processes for the preparation of nitrile rubbers capable of giving vulcanizable elastomeric compositions having high vulcanization rates, a good vulcanization yield, and causing a low fouling of the moulds, in particular elastomeric compositions that can be advantageously used in injection moulding processes, it still of great interest.

The Applicant has therefore considered the problem of finding a process for the production of nitrile rubbers capable of giving vulcanizable elastomeric compositions having high vulcanization rates, a good vulcanization yield, and causing a low fouling of the moulds, in particular elastomeric compositions that can be advantageously used in injection moulding processes.

The Applicant has now found that the production of nitrile rubber capable of giving vulcanizable elastomeric compositions having the above characteristics, can be advantageously carried out by subjecting the latexes obtained from the emulsion polymerization of at least one α,β-unsaturated nitrile, of at least one conjugated diene and, optionally, of one or more further copolymerizable monomers to coagulation in the presence of at least one metal sulfate obtaining coagulated nitrite rubbers, and subjecting said coagulated nitrile rubbers to washing with water in the presence of at least one inorganic base. The nitrile rubbers thus obtained are capable of giving vulcanizable elastomeric compositions having a high vulcanization rate, said vulcanization rate being expressed as the difference between the time at which 90% of the vulcanization takes place ($T_{90}$) and the scorch time ($T_{S2}$) after which the vulcanization initiates. Said elastomeric compositions also have a good vulcanization yield expressed as the difference between the maximum torque measured and the minimum torque measured (MH–ML). Said elastomeric compositions also cause a low fouling of the moulds and can consequently be advantageously used in injection moulding processes.

An object of the present invention therefore relates to a process for the preparation of a nitrile rubber comprising:
- subjecting at least one α,β-unsaturated nitrile, at least one conjugated diene and, optionally, one or more further copolymerizable monomers, to emulsion polymerization, in the presence of at least one alkyl thiol containing from 12 to 16 carbon atoms and at least three tertiary carbon atoms and having the sulfur bound to one of said tertiary carbon atoms, at a pH ranging from 7 to 10, preferably from 8 to 9, obtaining a latex;
- subjecting said latex to coagulation, in the presence of at least one metal sulfate selected from magnesium, sodium, potassium, preferably magnesium, at a temperature higher than or equal to 30° C., preferably ranging from 40° C. to 60° C., obtaining a coagulated nitrile rubber:
- subjecting said coagulated nitrile rubber to washing with water, in the presence of at least one inorganic base, selected from sodium hydroxide, potassium hydroxide, calcium hydroxide, magnesium hydroxyide, lithium hydroxide, preferably potassium hydroxyide, at a pH higher than or equal to 10, preferably ranging from 11 to 12.

For the purpose of the present description and of the following claims, the definitions of the numerical ranges always comprise the extremes unless otherwise specified.

According to a preferred embodiment of the present invention, said α,β-unsaturated nitrile can be selected from α,β-unsaturated nitriles having from 3 to 5 carbon atoms, such as acrylonitrile, methacrylonitrile, ethacrylonitrile, α-chloroacrylonitrile, or mixtures thereof. Acrylonitrile is preferred.

According to a preferred embodiment of the present invention, said conjugated diene can be selected from conjugated dienes having from 4 to 6 carbon atoms, such as, for example, 1,3-butadiene, isoprene, 2,3-dimethylbutadiene, piperylene, 1,3-pentadiene, or mixtures thereof. 1,3-butadiene is preferred.

According to a preferred embodiment of the present invention, said nitrile rubber is an acrylonitrile-butadiene (NBR) copolymer.

According to a preferred embodiment of the present invention, said one or more further copolymerizable monomers can be selected, for example, from α,β-unsaturated monocarboxylic or dicarboxylic acids, their esters or their amides, or mixtures thereof. Nitrile rubbers containing one or more of said copolymerizable monomers are generally indicated as carboxylated nitrile rubbers (also known as XNBRs).

α,β-unsaturated monocarboxylic or dicarboxylic acids that can be used for the purpose of the present invention are: fumaric acid, maleic acid, acrylic acid, methacrylic acid, crotonic acid, itaconic acid.

Esters of said α,β-unsaturated monocarboxylic or dicarboxylic acids that can be used for the purpose of the present invention are, for example, alkyl esters such as, for example, methyl(meth)acrylate, ethyl(meth)acrylate, propyl(meth)acrylate, n-butyl(meth)acrylate, t-butyl-(meth)acrylate, hexyl(meth)acrylate, 2-ethylhexyl(meth)acrylate, octyl(meth)acrylate, lauryl(meth)acrylate; or mixtures thereof; alkoxyalkyl n-esters such as, for example, methoxyethyl (meth)acrylate, ethoxyethyl(meth)acrylate, methoxybutyl (meth)acrylate, or mixtures thereof; hydroxyalkyl esters such as, for example, hydroxyethyl(meth)acrylate, hydroxypropyl(meth)acrylate, hydroxybutyl(meth)acrylate, or mixtures thereof; or mixtures thereof.

Further esters of α,β-unsaturated monocarboxylic or dicarboxylic acids that can be used for the purpose of the present invention are, for example, polyethyleneglycol (meth)acrylate, polypropyleneglycol(meth)acrylate, glycidyl(meth)acrylate, epoxy(meth)acrylate, urethane(meth) acrylate, or mixtures thereof.

Further copolymerizable monomers that can be used for the purpose of the present invention are vinyl aromatic monomers such as, for example, styrene, α-methylstyrene, vinylpyridine, or mixtures thereof.

The quantities of said α,β-unsaturated nitrile and of said conjugated diene in the nitrile rubbers obtained with the process object of the present invention, can vary within a wide range. The quantity of α,β-unsaturated nitrile, or the sum of α,β-unsaturated nitriles, generally ranges from 5% by weight to 80% by weight, preferably from 10% by weight to 60% by weight, more preferably from 15% by weight to 40% by weight, with respect to the total weight of the nitrile rubber. The quantity of conjugated diene, or the sum of conjugated dienes, generally ranges from 20% by weight to 95% by weight, preferably from 40% by weight to 90% by weight, more preferably from 60% by weight to 85% by weight, with respect to the total weight of the nitrile rubber. The total quantity of α,β-unsaturated nitrile(s) and of conjugated diene(s) in the nitrile rubber must in any case be equal to 100% by weight.

Said one or more further copolymerizable monomers optionally present, can be present in a quantity ranging from 0% by weight to 40% by weight, preferably from 0.1% by weight to 40% by weight, more preferably from 1% by weight to 30% by weight, with respect to the total weight of the nitrile rubber. In this case, the quantities corresponding to the α,β-unsaturated nitrile(s) and/or to the conjugated diene(s) are substituted by the quantities of said one or more further copolymerizable monomers, on the condition that the total quantity of α,β-unsaturated nitrile(s), of conjugated diene(s) and of said one or more further copolymerizable monomers in the nitrile rubber must in any case be equal to 100% by weight. If esters of (meth)acrylic acid are used as further copolymerizable monomer(s), they are generally used in a quantity ranging from 1% by weight to 25% by weight with respect to the total weight of the nitrile rubber. If α,β-unsaturated monocarboxylic or dicarboxylic acids are used as further copolymerizable monomer(s), they are generally used in a quantity lower than 10% by weight with respect to the total weight of the nitrile rubber.

Said emulsion polymerization is generally carried out in the presence of at least one emulsifying agent. Said emulsifying agent can be selected, for example, from water-soluble salts of anionic emulsifying agents or of non-ionic emulsifying agents. Water-soluble salts of anionic emulsifying agents are preferably used.

Water-soluble salts of anionic emulsifying agents that can be used for the purpose of the present invention are, for example, sodium, potassium, lithium or ammonium salts, preferably sodium or potassium, of modified resinic acids which are obtained by dimerization, disproportionation, hydrogenation, modification of the mixtures of resinic acid containing abietic acid, neoabietic acid, palustric acid, levopimaric acid, or mixtures of said salts.

Alternatively, for the purpose of the present invention, sodium, potassium, lithium or ammonium salts, preferably sodium or potassium, of fatty acids, saturated or unsaturated, containing from 6 to 22 carbon atoms in the molecule, such as, for example, caproic acid, lauric acid, myristic acid, palmitic acid, stearic acid, oleic acid, linoleic acid, linolenic acid, or mixtures thereof, or mixtures of said salts, can be used as anionic emulsifying agents.

Alternatively, for the purpose of the present invention, sodium, potassium, lithium or ammonium salts, preferably sodium or potassium, of carboxylic acids deriving from oils or fats of a specific origin such as, for example, cotton-seed oil, peanut oil, linseed oil, coconut oil, palm-seed oil, olive oil, rape-seed oil, soybean oil, fish oil, or mixtures thereof, or mixtures of said salts, can be used as anionic emulsifying agents.

Alternatively, for the purpose of the present invention, sodium, potassium, lithium or ammonium salts, preferably sodium or potassium, of sulfonates, sulfates or phosphates, that are bound to an organic radical, or mixtures of said salts, can be used as anionic emulsifying agents. Examples of organic radicals are: aliphatic radicals, aromatic or alkyl aromatic radicals, fused aromatic radicals and aromatic radicals with a methylene bridge, said fused aromatic radicals and aromatic radicals with a methylene bridge being optionally alkylated with alkyl chains having from 6 to 25 carbon atoms.

Examples of these salts of sulfonates, sulfates or phosphates that can be used for the purpose of the present invention are: sodium laurylsulfate, sodium alkylsulfonate, sodium alkylarylsulfonate, salts of sodium arylsulfonates with a methylene bridge, salts of alkylated sodium naphthalenesulfonates, salts of sodium naphthalenesulfonates with a methylene bridge that can also be oligomerized, with an oligomerization degree ranging from 2 to 10. Alkylated naphthalenesulfonic acids and naphthalenesulfonic acids with a methylene bridge, optionally alkylated, can be present as mixtures of isomers that can also contain more than one group of sulfonic acid (2-3 groups of sulfonic acid) in the molecule.

Non-ionic emulsifying agents that can be used for the purpose of the present invention are, for example, the products obtained from the addition of ethylene oxide and propylene oxide on compounds having a sufficient quantity of acid hydrogens such as, for example, phenol, alkylated phenol, alkylated amines, or mixtures of these products. Examples of these non-ionic emulsifying agents are ethoxylated nonylphenols containing 8, 10 or 12 units of ethylene oxide. Said non-ionic emulsifying agents can be used alone or, preferably, together with anionic emulsifying agents.

Preferably, said anionic and/or non-ionic emulsifying agents can be used in a quantity ranging from 0.05 parts by weight to 15 parts by weight, preferably from 0.5 parts by weight to 15 parts by weight, more preferably ranging from 1 part by weight to 10 parts by weight, per 100 parts by weight of the mixture of polymerization monomers.

For the purpose of the present invention and of the following claims, the term "mixture of polymerization monomers", refers to the mixture comprising at least one α,β-unsaturated nitrile, at least one conjugated diene and, optionally, one or more further copolymerizable monomers, used in the emulsion polymerization.

As specified above, the emulsion polymerization is carried out using the emulsifying agents specified above. If the latexes obtained after polymerization tend towards premature self-coagulation, said emulsifying agents can also be optionally added after the formation of said latexes. Said addition may, in particular, be necessary before the removal of the non-reacted monomers from said latexes, or before the possible storage of said latexes.

In order to regulate the molecular weight of the nitrile rubber, as specified above, the emulsion polymerization is carried out in the presence of at least one alkyl thiol containing from 12 to 16 carbon atoms and at least three tertiary carbon atoms and having the sulfur bound to one of said tertiary carbon atoms.

According to a preferred embodiment of the present invention, said alkyl thiol can be selected from: 2,2,4,6,6-pentamethylheptane-4-thiol, 2,4,4,6,6,8,8-pentamethylnonane-4-thiol, or mixtures thereof. 2,2,4,6,6-pentamethylheptane-4-thiol is preferred.

According to a further preferred embodiment of the present invention, said alkyl thiol is a mixture comprising:
2,2,4,6,6-pentamethylheptane-4-thiol;
2,4,4,6,6-pentamethylheptane-2-thiol;
2,3,4,6,6-pentamethylheptane-2-thiol;
2,3,4,6,6-pentamethylheptane-3-thiol.

The alkyl thiols indicated above are products available on the market, for example, tertiary dodecyl mercaptane (TDM of Lanxess), or they can be prepared according to processes known in the art such as, for example, that described in Japanese patent application JP 07/316,126 and JP 07/316,127, in English patent applications GB 823,823 and GB 823,824, or in American patent application US 2008/0293902.

According to a preferred embodiment of the present invention, said alkyl thiol can be used in a quantity ranging from 0.05 parts by weight to 3 parts by weight, preferably from 0.1 parts by weight to 1.5 parts by weight, per 100 parts by weight of the mixture of polymerization monomers.

Said alkyl thiol can be introduced at the beginning of the polymerization, or at different moments during the polymerization, preferably at different moments during the polymerization.

Said emulsion polymerization is generally carried out in the presence of at least one free-radical initiator selected from peroxides, such as, for example, hydrogen peroxide; peroxydisulfates or their sodium, potassium or ammonium salts; peroxydiphosphates or their sodium, potassium or ammonium salts; hydroperoxides; peracids and their esters or anhydrides; peroxides having two organic radicals, or mixtures thereof.

Free-radical initiators that can be used for the purpose of the present invention are, for example: t-butyl hydroperoxide, hydroperoxide, di-isopropyl-benzene hydroperoxide, dibenzoyl peroxide, azo-bisisobutyronitrile, azo-bis-valeronitrile, azo-biscyclohexanenitrile, or mixtures thereof.

These free-radical initiators can be used in the presence of a reducing agent which can be selected, for example, from: sulfenates; sulfinates; sulfoxylates; dithionites; sulfites; metabisulfites; disulfites; sugars; urea; thiourea; xanthogenates; thioxanthogenates; hydrazinium salts; amines and amine derivatives such as, for example, aniline, dimethylaniline, monoethanolamine, diethanolamine, triethanolamine; or mixtures thereof.

Systems comprising an oxidizing agent and a reducing agent are generally known as "redox" systems. Said "redox" systems generally comprise salts of transition metals such as iron, cobalt, nickel and complexing agents such as, for example, sodium ethylenediaminetetraacetate, sodium nitrilotriacetate, trisodium phosphate, tetrapotassium diphosphate.

Redox systems that can be used for the purpose of the present invention are, for example: potassium peroxydisulfate combined with triethanolamine; ammonium peroxydiphosphate combined with sodium metabisulfite ($Na_2S_2O_5$); di-isopropyl-benzene hydroperoxide/sulfoxylated sodium formaldehyde combined with iron sulfate ($FeSO_4.7H_2O$).

The free-radical initiator or the redox system can be used in a quantity ranging from 0.001 parts by weight to 3 parts by weight, preferably ranging from 0.005 parts by weight to 1 part by weight, per 100 parts by weight of the mixture of polymerization monomers.

The free-radical initiator or the redox systems can be introduced at the beginning of the polymerization, or during the polymerization. Addition during the polymerization is preferred, so as to control the polymerization rate.

Said polymerization can be carried out for a time ranging from 5 hours to 15 hours and essentially depends on the content of α,β-unsaturated nitrile(s) contained in the polymerization mixture and on the polymerization temperature. The polymerization temperature preferably ranges from 0° C. to 30° C., more preferably from 5° C. to 25° C. When the polymerization conversion has reached a value ranging from 50% to 90%, preferably from 70% to 85%, the polymerization is interrupted.

For the above purpose, at least one stopper is added to the reaction mixture.

Stoppers that can be used for the purpose of the present invention are, for example, dimethyl dithiocarbamate; sodium nitrite; hydrazines or their salts; hydroxylamines or their salts; or mixtures thereof. Specific examples of stoppers are: hydroxylamine sulfate, hydroxylammonium sulfate, diethylhydroxylamine, di-isopropyl hydroxylamine.

The stopper can be used in a quantity ranging from 0.05 parts by weight to 15 parts by weight, preferably ranging from 0.1 parts by weight to 10 parts by weight, per 100 parts by weight of the mixture of polymerization monomers.

The quantity of water used in said emulsion polymerization preferably ranges from 100 parts by weight to 900 parts by weight, more preferably ranging from 120 parts by weight to 500 parts by weight, even more preferably ranging from 150 parts by weight to 400 parts by weight, per 100 parts by weight of the mixture of polymerization monomers.

In order to carry out the emulsion polymerization at a pH ranging from 7 to 10, preferably from 8 to 9, according to the process of the present invention, salts can be added to the mixture of polymerization monomers.

Preferably, said salts can be selected from salts of monovalent metals such as, for example, sodium hydroxide, potassium hydroxide, sodium sulfate, sodium carbonate, sodium hydrogencarbonate, sodium chloride, potassium chloride. Potassium hydroxide, sodium hydroxyide, sodium hydrogencarbonate, potassium chloride, are preferred. Said salts are preferably added in a quantity ranging from 0 parts by weight to 1 part by weight, more preferably from 0.001 parts by weight to 0.5 parts by weight, per 100 parts by weight of the mixture of polymerization monomers.

The emulsion polymerization can be carried out batchwise or in continuous.

The α,β-unsaturated nitrile(s) and the conjugated diene(s) can be introduced into the polymerization mixture at the beginning of the polymerization, or partly at the beginning and partly during the polymerization. Preferably, the α,β-unsaturated nitrile(s) is/are introduced partly at the beginning (initial charge) and partly during the polymerization (feeding).

In order to remove the non-reacted monomers and the volatile components from the latex obtained from said emulsion polymerization, said latex can be subjected, for example, to vapour distillation, at a temperature ranging from 70° C. to 150° C., reducing the pressure at temperatures lower than 100° C.

Before said removal, the latex obtained can be stabilized by the addition of an emulsifying agent which can be selected from those indicated above. For this purpose, said emulsifying agents can be added in a quantity ranging from 0.1 phr to 2.5 phr, preferably from 0.5 phr to 2.0 phr.

For the purpose of the present invention and of the following claims, the term "phr" indicates the parts by weight of a certain component per 100 parts by weight of nitrile rubber.

Before or during the coagulation, at least one anti-aging agent can be added to said latex, selected, for example, from: sterically hindered phenols such as, for example, 2,6-di-t-butylphenol, 2,6-di-t-butyl-p-cresol (BHT), 2,6-di-t-butyl-4-ethylphenol, 2,2'-methylenebis-(4-methyl-6-t-butyl-phenol) (BPH); amines, such as, for example, mixtures of diaryl-p-phenylenediamines (DTPD), diphenylamine octylate (ODPA), phenyl-α-naphthylamine (PAN), phenyl-β-naphthylamine (PBN), N-isopropyl-n-phenyl-p-phenylenediamine, N-1,3-dimethylbutyl-N-phenyl-p-phenylenediamine (6PPD), N-1,4-dimethylpentyl-N-phenyl-p-phenylenediamine (7 PPD), N,N'-bis-1,4-(1,4-dimethylpentyl)-p-phenylenediamine (77PD); phosphites, for example, tris(nonylphenyl)phosphite; polymerized 2,2,4-trimethyl-1,2-dihydroquinoline (TMQ); benzoimidazoles such as, for example, 2-mercaptobenzimidazole (MBI), methyl-2-mercaptobenzimidazole (MMBI), zinc-methylmercaptobenzimidazole (ZMMBI). The phosphites are generally used together with the sterically hindered phenols.

A latex having a pH of at least 6, preferably >6, is preferably used for the coagulation. If necessary, said pH can be obtained by the addition of at least one inorganic base to the latex, preferably sodium hydroxyide, ammonium hydroxide, potassium hydroxide.

The metal sulfate used in the coagulation of the latex is preferably used in the form of an aqueous solution, preferably in the form of a saturated aqueous solution. Said aqueous solution can be prepared using deionized water, or non-deionized water.

According to a preferred embodiment of the present invention, said metal sulfate can be present in the latex in a quantity ranging from 0.5 phr to 200 phr, preferably ranging from 0.8 phr to 80 phr, more preferably ranging from 1 phr to 50 phr.

The coagulation of the latex can be carried out batchwise or in continuous.

In order to assist the coagulation, in addition to said metal sulfate, at least one precipitation aid can be added to the latex. Said precipitation aid can be selected, for example, from non-ionic, cationic, anionic water-soluble polymers.

Non-ionic polymers that can be used for the purpose of the present invention are: modified cellulose such as hydroxyalkylcellulose or methylcellulose; adducts of ethylene oxide and of propylene oxide on compounds having an acid hydrogen; or mixtures thereof. Examples of compounds having an acid hydrogen are: fatty acids, sugars (e.g., sorbitol), monoglycerides and diglycerides of fatty acids, phenols, alkylated phenols, alkylphenol/formaldehyde condensates, or mixtures thereof.

Anionic polymers that can be used for the purpose of the present invention are: homopolymers or copolymers of (meth)acrylic acid, of maleic acid, of maleic anhydride, or their salts, or mixtures thereof.

Cationic polymers that can be used for the purpose of the present invention are: polymers based on polyamines, homopolymers and copolymers of (meth)acrylamide, or mixtures thereof.

The precipitation aid can be present in the latex in a quantity ranging from 0.01 phr to 5 phr, preferably ranging from 0.05 phr to 2.5 phr.

According to a preferred embodiment of the present invention, the latex obtained from said emulsion polymerization can have a concentration of solids ranging from 1% by weight to 40% by weight, preferably ranging from 5% by weight to 35% by weight, more preferably ranging from 10% by weight to 30% by weight, with respect to the total weight of the latex.

After coagulation, the nitrile rubber coagulated is generally present in the form of crumbs.

The water used for said washing with water, can be either deionized water or non-deionized water.

According to a preferred embodiment of the present invention, said washing with water can be carried out at a temperature ranging from 35° C. to 90° C., preferably ranging from 40° C. to 90° C.

According to a preferred embodiment of the present invention, the quantity of water used in said washing with water can range from 0.5 phr to 20 phr, preferably from 1 phr to 10 phr, more preferably from 1.5 phr to 5 phr.

The nitrile rubber can be subjected to one or more washings with water, for example, from one to seven washings, which can be carried out batchwise or in continuous, preferably in continuous. A partial drying of the nitrile rubber can also be carried out between one washing and the next.

At the end of the washing with water, the nitrile rubber is generally subjected to dewatering. The dewatering can be carried out in two steps, by subjecting the nitrile rubber first to a mechanical treatment, for example by means of screw devices and subsequently to evaporation by means of, for example, of a stove, heating plate; or in a single step by subjecting the nitrile rubber directly to evaporation by means of, for example, stove, heating plate. Said dewatering can be carried out at a temperature ranging from 80° C. to 150° C., for a time ranging from 10 hours to 48 hours, preferably from 12 hours to 30 hours: the time must in any case be sufficient for obtaining a nitrile rubber having a residual humidity of less than 1% by weight with respect to the total weight of the nitrile rubber.

The nitrile rubber obtained with the process, object of the present invention can be advantageously used in vulcanizable elastomeric compositions.

A further object of the present invention therefore relates to a vulcanizable elastomeric composition comprising at least one nitrile rubber obtained as described above and at least one vulcanizing agent.

Said vulcanizing agent can be selected, for example, from peroxides such as, for example, bis(2,4-dichlorobenzyl) peroxide, dibenzoyl peroxide, bis(4-chlorobenzoyl)peroxide, bis(t-butylperoxy)-3,3,5-trimethylcyclohexane, 2,2-bis(t-butylperoxy)butene, dicumyl peroxide, 2,5-dimethyl-2,5-di-(t-butylperoxy)hexane, t-butyl cumyl peroxide, 1,3-bis-(t-butylperoxyisopropyl)benzene, di-t-butyl peroxide, or mixtures thereof.

In order to increase the vulcanization yield it can also be advantageous to use, in addition to the above peroxides, other additives such as, for example, triallyl isocyanurate, triallyl cyanurate, trimethylolpropane tri(meth)acrylate, triallyl trimellitate, ethylene glycol trimellitate, butanediol dimethacrylate, trimethylolpropane trimethacrylate, zinc diacrylate, zinc dimethacrylate, 1,2-polybutadiene, N,N'-m-phenylenedimaleimide, or mixtures thereof.

The peroxides, as such or together with the other additives indicated above, are generally present in said vulcanizable elastomeric composition in a quantity ranging from 1 phr to 20 phr, preferably ranging from 2 phr to 10 phr.

Said vulcanizing agent can also be selected from soluble or insoluble elemental sulfur, or from sulfur donors, or mixtures thereof.

Sulfur donors are, for example, dimorpholyl disulfide (DTDM), 2-morpholine-dithiobenzothiazole (MBSS), caprolactam disulfide, dipentamethylenethiuram tetrasulfide (DPTT), tetramethylthiuram disulfide (TMTD), or mixtures thereof.

If the vulcanizing agent is selected from sulfur or sulfur donors, in order to increase the vulcanization yield, it can also be advantageous to use other additives such as, for example, dithiocarbamates, thiurams, thiazoles, sulfenamides, xanthogenates, derivatives of guanidine, caprolactams, derivatives of thiourea, or mixtures thereof.

In said vulcanizable elastomeric composition, said sulfur and/or said sulfur donors, and said other additives indicated above optionally present, are generally present in a quantity ranging from 0.05 phr to 10 phr, preferably ranging from 0.1 phr to 8 phr.

Other inorganic or organic compounds can be added to the vulcanizable elastomeric compositions object of the present invention. Examples of said compounds are: zinc oxide; zinc carbonate; lead oxide; saturated or unsaturated organic fatty acids or their zinc salts; polyalcohols; amine alcohols (e.g., triethanolamine); amines (e.g., dibutylamine, dicyclohexylamine, cyclo-hexylethylamine); polyether amines; or mixtures thereof.

Vulcanization inhibitors such as, for example, cyclohexylthiophthalimide (CTP), N,N'-dinitrosopentamethylenetetramine (DNPT), phthalic anhydride (PTA), diphenylnitrosamine, or mixtures thereof, can also be used.

In addition to the above vulcanizing agents and/or other compounds indicated above, the vulcanizable elastomeric composition object of the present invention, can comprise other additional additives normally used in rubber and known to experts in the field such as, for example, fillers, filler activators, ozone protection agents, aging inhibitors, antioxidants, processing aids, extender oils, plasticizers, reinforcing materials, mould releasing agents.

Fillers that can be used for the purpose of the present invention are, for example: carbon black, silica, barium sulfate, titanium dioxide, zinc oxide, calcium oxide, calcium carbonate, magnesium oxide, aluminium oxide, iron oxide, aluminium hydroxide, magnesium hydroxide, aluminium silicates, diatomaceous earth, talc, kaolins, bentonites, carbon nanotubes, Teflon® (preferably in powder form), silicates, or mixtures thereof. The quantity of fillers generally ranges from 10 phr to 500 phr.

Filler activators that can be used for the purpose of the present invention are, for example: organic silanes such as, for example, vinyltrimethyloxysilane, vinyldimethoxymethylsilane, vinyltriethoxysilane, vinyltris-(2-methoxyethoxy) silane, N-cyclohexyl-3-aminopropyl-trimethoxysilane, 3-aminopropyl-trimethoxysilane, methyltrimethoxysilane, methyltriethoxysilane, dimethyldimethoxysilane, dimethyldiethoxysilane, trimethylethoxysilane, isooctyltrimethoxysilane, isooctyltriethoxysilane, hexadecyltrimethoxysilane, (octadecyl)methyldimethoxysilane, or mixtures thereof. Further filler activators are, for example, surfactant substances such as triethanolamine, ethylene glycols, or mixtures thereof. The quantity of filler activators generally ranges from 0 phr to 10 phr.

Aging inhibitors can be selected from those described above and can generally be used in a quantity ranging from 0 phr to 5 phr, preferably from 0.5 phr to 3 phr.

When used in injection moulding, said vulcanizable elastomeric composition can comprise mould releasing agents. Mould releasing agents that can be used for the purpose of the present invention are, for example: saturated or partially unsaturated fatty acids, acid oils, or derivatives thereof such as, for example, fatty acid esters, fatty acid salts, fatty acid alcohols, fatty acid amides, or mixtures thereof. Mould releasing agents that can be applied to the surface of the mould such as, for example low-molecular-weight silicon-based compounds, compounds based on fluoropolymers, compounds based on phenolic resins, or mixtures thereof, can also be used.

The quantity of mould releasing agents generally ranges from 0 phr to 10 phr, preferably from 0.5 phr to 5 phr.

The vulcanizable elastomeric composition object of the present invention, can also comprise reinforcing agents such as, for example, glass fibers, cords, woven fabrics, fibers composed of aliphatic or aromatic polyamides (Nylon®, Aramid®), polyesters, natural fiber products, or mixtures thereof.

The present invention also relates to the use of said vulcanizable elastomeric composition in an injection moulding process. Said vulcanizable elastomeric composition can be used for producing sealing materials such as, for example, O-rings, sealing casings, or other articles such as, for example, belts, tubes, electrical parts, parts for automobiles, shoes.

Some illustrative and non-limiting examples are provided hereunder for a better understanding of the present invention and for its practical embodiment.

EXAMPLES

The following characterization and analysis techniques were used.
Properties of the Copolymer
Determination of the Ion Content of the Nitrile Rubber The inductively coupled plasma-atomic emission spectrometry (ICP-AES) technique was used on a sample of nitrile rubber suitably mineralized according to the following process.

2 g of nitrile rubber were incinerated in a microwave muffle, at about 550° C., for 3 hours, in a porcelain crucible. 2 ml of concentrated nitric acid at 90% by weight were added to the residue obtained which was then heated on a plate for a few minutes. The solution obtained was transferred to a 50 ml flask and brought to volume with water. The solution was examined using an ICP-AES spectrometer at the following specific absorption wavelengths of each metal:

Calcium: 317.93 nm;
Magnesium: 285.21 nm;
Potassium: 766.49 nm;
Sodium: 589.59 nm.

The calibration solutions of the ICP-AES spectrometer were obtained by dilution of standard concentrated and certified solutions. Three calibration points were normally used: 10 ppm, 5 ppm, 1 ppm, in a solution of nitric acid at 5% by weight.
Determination of the pH of the Nitrile Rubber 3 g of nitrile rubber cut into small pieces were introduced, for the purpose, into a 150 ml cylinder containing 100 ml of chloroform and the whole mixture was subjected to stirring and under a nitrogen seal to prevent contact with carbon dioxide ($CO_2$). The nitrile rubber was left to dissolve completely at room temperature (25° C.) and, after dissolution, 50 ml of bidistilled water adjusted to pH=7 were added with a calibrated pipette with an aqueous solution at 1% of sodium hydroxide, and the solution was left under vigorous stirring for 2 hours. The solution obtained was subsequently collected and subjected to centrifugation at 3,000 revs for 30 minutes. At the end of the centrifugation, the aqueous phase was removed and the pH was measured.
Determination of the Content of Acrylonitrile Bound to the Nitrile Rubber The content of bound acrylonitrile was determined by measuring the total nitrogen in the nitrile rubber obtained using a LECO FP 528 analyzer, calculating the bound acrylonitrile from the total nitrogen content.
Determination of the Mooney Viscosity of the Nitrile Rubber The measurement was carried out at 100° C., using 45 g of nitrile rubber, by means of a 200 E instrument of Alpha Technology according to the method ASTM D1646.
Determination of the Ion Index of the Nitrile Rubber The ion index (II1) and the ion index (II2) of the nitrile rubber were determined according to the following formulae (1) and (2), respectively:

$$II1 = \frac{3c(Ca^{2+})}{40 \text{ g/ml}} - \left[\frac{c(Na^+)}{23 \text{ g/ml}} + \frac{c(K^+)}{39 \text{ g/ml}}\right] \quad (1)$$

$$II2 = 3\left[\frac{c(Ca^{2+})}{40 \text{ g/ml}} + \frac{c(Mg^{2+})}{24 \text{ g/ml}}\right] - \left[\frac{c(Na^+)}{23 \text{ g/ml}} + \frac{c(K^+)}{39 \text{ g/ml}}\right] \quad (2)$$

wherein $c(Ca^{2+})$, $c(Mg^{2+})$, $c(Na^+)$, and $c(K^+)$, indicate the concentrations of the calcium, magnesium, sodium and potassium ions in the nitrile rubber in ppm.
Properties of the Elastomeric Composition The quantities of the compounds used for the preparation of the elastomeric composition are indicated in Table 1. The elastomeric composition was prepared in an open mixer according to the method ASTM D3182.

The vulcanization curves and the measurement of the relative parameters (MH, ML, t90, ts2) were carried out using a rheometer 100 S Monsanto, at a temperature of 160° C., according to the method ASTM D3187.

TABLE 1

| COMPONENTS | QUANTITY (phr) | QUANTITY (g) |
|---|---|---|
| Nitrile rubber (NBR) | 100 | 400 |
| Zinc oxide | 3 | 12 |
| Sulfur | 1.5 | 6 |
| Stearic acid | 1 | 4 |
| HAF IRB6* | 40 | 160 |
| TBBS** | 0.7 | 2.8 |

*HAF IRB6: carbon black (Greif Corp.);
**TBBS: N-t-butyl-1,2-benzothiazolesulfenamide (Nist).

Mould Fouling Evaluation

The elastomeric composition obtained as described above and indicated in Table 1, was injected through a 1 cm hole into a closed mould consisting of two plates with about 12 holes having a diameter of 10 mm, perfectly coinciding, having a sandwich configuration, with a thickness of the interspace thus obtained of about 2 mm. Once the mould had been filled, the elastomeric composition was vulcanized at about 220° C. for about 2 minutes, at a pressure of about 20 Kg/cm$^2$.

At the end of the vulcanization, the mould was opened to remove the vulcanized elastomeric composition and then re-closed to proceed with a subsequent injection of elastomeric composition again through the hole between the two metallic plates to proceed with a new vulcanization.

Said procedure was repeated 50 times and the fouling evaluation was given according to a scale of values from 1 to 6 (the maximum value 6 indicates the worst fouling, the minimum value 1 indicates no fouling), observing the O-rings of elastomeric composition obtained after each opening of the mould and verifying the presence of anomalous deposits in both the O-rings obtained and in the mould.

Examples 1-3

Three latexes A, B and C were produced using the components indicated in Table 2: the quantities of the various components are expressed in phr.

TABLE 2

| COMPONENTS | EXAMPLE 1 (Latex A) | EXAMPLE 2 (Latex B) | EXAMPLE 3 (Latex C) |
|---|---|---|---|
| Deionized water | 180 | 180 | 180 |
| Butadiene | 72.75 | 66.42 | 72.75 |
| Acrylonitrile (initial charge) | 8.35 | 13.53 | 8.35 |
| Acrylonitrile (feeding) | 18.9 | 23.1 | 18.9 |
| DIHP$^{(1)}$ | 0.10 | 0.10 | 0.1 |
| TDM$^{(2)}$ (initial charge) | 0.312 | 0.45 | 0.45 |
| TDM$^{(2)}$ (booster1-booster2) | 0.039-0.039 | 0-0.08 | 0-0.08 |
| Fatty soap$^{(3)}$ | 0.48 | 0.48 | 0.48 |
| DNMK$^{(4)}$ | 3.30 | 3.30 | 3.30 |
| Reducing agent$^{(5)}$ | 0.12 | 0.12 | 0.12 |
| Shortstop$^{(6)}$ | 10.8 | 10.8 | 10.8 |

$^{(1)}$di-isopropyl-benzene hydroperoxide (Sasol);
$^{(2)}$tertiary dodecyl mercaptan (Lanxess);
$^{(3)}$aqueous solution at 5.4% by weight of potassium stearate (Oleon);
$^{(4)}$aqueous solution at 45% by weight of potassium salt of naphthalenesulfonic acid condensed with formaldehyde (Dalton);
$^{(5)}$aqueous solution of sodium formaldehyde sulfoxylate (FSS) prepared as indicated in Table 3;
$^{(6)}$aqueous solution at 2% by weight of hydroxylamine sulfate (Basf).

TABLE 3

| COMPONENTS | phr |
|---|---|
| Water | 9.9 |
| EDTA$^{(1)}$ | 0.01 |
| FSS$^{(2)}$ | 0.075 |
| H$_2$SO$_4$ | 0.0008 |
| FeSO$_4$*7H$_2$O | 0.004 |

$^{(1)}$bisodium salt of ethylenediamine tetracetic acid (Trilon ® B-Basf);
$^{(2)}$formic aldehyde sulfoxylate (rodite) (Buggolite ® C-Bruggeman).

The three latexes A, B and C, were prepared in a 70 liter steel autoclave, equipped with a stirrer. Details relating to the preparation of the three latexes are provided hereunder.

Preparation of Latex A

The following components were charged in order into the autoclave: 9.92 kg of deionized water, 0.53 kg of aqueous solution at 5.4% by weight of potassium stearate and 0.440 kg of DNMK. The mixture obtained was stirred and its pH was corrected by adding an aqueous solution at 10% by weight of potassium hydroxide, up to a pH equal to 8.5. The autoclave was then closed and flushed with nitrogen. A vacuum was applied and the following components were charged in order: 500 g of acrylonitrile, 18.72 g of TDM and 4.37 kg of butadiene: the mixture obtained was subjected to stirring and subsequently cooled to 7° C. When this temperature had been reached, 6 g of DIHP were injected, immediately followed by 139 g of aqueous solution of sodium formaldehyde sulfoxylate (FSS) prepared as indicated in Table 3. The polymerization mixture was maintained at a temperature of 7° C. for the whole polymerization time. The remaining acrylonitrile (1.134 kg) was then fed in continuous, with a flow-rate equal to 0.162 kg/h.

The conversion degree was followed during polymerization by collecting samples of latex from the bottom of the autoclave and determining the solid content percentage. At 37% of conversion, a first addition was carried out ("booster 1") of 2.34 g of TDM. A subsequent addition ("booster 2") of 2.34 g of TDM was carried out at a conversion of 59%.

The polymerization was interrupted at 70% conversion (after 7 hours) by adding 515 g of aqueous solution at 2% by weight of hydroxylamine sulfate. The non-reacted monomers were removed by distillation in a stream of vapour (stripping).

Preparation of Latex B

The following components were charged in order into the autoclave: 9.92 kg of deionized water, 0.53 kg of aqueous solution at 5.4% by weight of potassium stearate and 0.440 kg of DNMK. The mixture obtained was stirred and its pH was corrected by adding an aqueous solution at 10% by weight of potassium hydroxide, up to a pH equal to 8.5. The autoclave was then closed and flushed with nitrogen. A vacuum was applied and the following components were charged in order: 815 g of acrylonitrile, 21.85 g of TDM and 4.0 kg of butadiene: the mixture obtained was subjected to stirring and subsequently cooled to 7° C. When this temperature had been reached, 6 g of DIHP were injected, immediately followed by 139 g of aqueous solution of sodium formaldehyde sulfoxylate (FSS) prepared as indicated in Table 3. The polymerization mixture was maintained at a temperature of 7° C. for the whole polymerization time. The remaining acrylonitrile (1.209 kg) was then fed in continuous, with a flow-rate equal to 0.173 kg/h.

The conversion degree was followed during polymerization by collecting samples of latex from the bottom of the autoclave and determining the solid content percentage. At 59% of conversion, an addition was carried out ("booster 2") of 5.45 g of TDM.

The polymerization was interrupted at 70% conversion (after about 7 hours) by adding 515 g of aqueous solution at 2% by weight of hydroxylamine sulfate. The non-reacted monomers were removed by distillation in a stream of vapour (stripping).

Preparation of Latex C

The following components were charged in order into the autoclave: 9.92 kg of deionized water, 0.53 kg of aqueous solution at 5.4% by weight of potassium stearate and 0.440 kg of DNMK. The mixture obtained was stirred and its pH was corrected by adding an aqueous solution at 10% by weight of potassium hydroxide, up to a pH equal to 8.5. The autoclave was then closed and flushed with nitrogen. A vacuum was applied and the following components were charged in order: 500 g of acrylonitrile, 21.85 g of TDM and 4.37 kg of butadiene: the mixture obtained was subjected to stirring and subsequently cooled to 7° C. When this temperature had been reached, 6 g of DIHP were injected, immediately followed by 139 g of aqueous solution of sodium formaldehyde sulfoxylate (FSS) prepared as indicated in Table 3. The polymerization mixture was maintained at a temperature of 7° C. for the whole polymerization time. The remaining acrylonitrile (1.134 kg) was then fed, in continuous, with a flow-rate equal to 0.162 kg/h.

The conversion degree was followed during polymerization by collecting samples of latex from the bottom of the autoclave and determining the solid content percentage. At 59% of conversion, an addition was carried out ("booster 2") of 5.45 g of TDM.

The polymerization was interrupted at 70% conversion (after about 7 hours) by adding 515 g of aqueous solution at 2% by weight of hydroxylamine sulfate. The non-reacted monomers were removed by distillation in a stream of vapour (stripping).

The characteristics of the three latexes obtained at the end of the stripping are specified in Table 4.

TABLE 4

|  | Latex A | Latex B | Latex C |
|---|---|---|---|
| Solid content (%) | 15.6 | 16.2 | 15.2 |
| pH | 8.5 | 8.5 | 8.6 |

TABLE 4-continued

|  | Latex A | Latex B | Latex C |
|---|---|---|---|
| Content of bound ACN (%) | 28.1 | 33.9 | 27.9 |
| Mooney Viscosity | 60.5 | 32.1 | 29.0 |

Before being coagulated, a dispersion at 50% of antioxidant (2,6-di-t-butyl-p-cresol-BHT-Todini), was added to the above latexes, in a quantity equal to 1% by weight of active substance with respect to the total weight of the nitrile rubber. Said dispersion was prepared by means of an Ultraturex, by stirring 100 g of BHT in powder form, 8 g of DNMK and 100 g of deionized water.

Coagulation of the Latexes

The latexes A, B and C were subjected to coagulation in an open 70 liter recipient, under stirring, using a saturated aqueous solution of magnesium sulfate, operating under the following conditions.

43 kg of water and 4 kg of a saturated aqueous solution of magnesium sulfate were charged into a 70 liter recipient. The whole mixture was subjected to stirring and heated to 45° C. When this temperature had been reached, 10 kg of latex obtained as described above (Latex A, Latex B, Latex C) were gradually added, under continuous stirring, over a period of about 10 minutes. At the end of the addition of latex, the whole mixture was left under stirring for a further 10 minutes.

Washing of Coagulated Nitrile Rubber

The coagulated latexes were filtered to recover the crumbs of nitrile rubber which where then subjected to washing, operating under the following conditions.

40 kg of deionized water were charged into an open 70 liter recipient and brought to a pH of 11.5-11.8 (see Table 5 for the pH values) by the addition of 14 g of potassium hydroxide and subsequently heated to 45° C. When this temperature had been reached, 1.5 kg of crumbs of nitrile rubber obtained from the previous coagulation were introduced and the whole mixture was left, under stirring, for about 10 minutes, after which the nitrile rubber was filtered and dried in an air oven, at 100° C., for 24 hours (residual humidity: less than 1%).

Table 5 indicates the following characteristics of the nitrile rubber (NBR) obtained: content of metals present (ppm), pH and ion indexes.

Table 6, on the other hand, indicates the rheometric evaluations of the elastomeric compositions obtained as described above and indicated in Table 1, comprising the nitrile rubbers obtained according to the present invention and the classification obtained in the relative evaluation of the mould fouling.

TABLE 5

| SAMPLES | Coagulation salt | pH (washing $H_2O$) | pH (NBR obtained) | Ca (ppm) | Mg (ppm) | K (ppm) | Na (ppm) | II(1) (ppmxg/ mole) | II(2) (ppmxg/ mole) |
|---|---|---|---|---|---|---|---|---|---|
| EXAMPLE 1 (NBR from Latex A) | $MgSO_4$ | 11.5 | 10.5 | 171 | 1068 | 110 | 120 | 4.8 | 138.3 |
| EXAMPLE 2 (NBR from Latex B) | $MgSO_4$ | 11.8 | 11.0 | 98 | 1114 | 175 | 219 | −6.7 | 132.6 |
| EXAMPLE 3 (NBR from Latex C) | $MgSO_4$ | 11.5 | 10.2 | 54 | 855 | 210 | 120 | −6.5 | 100.3 |

TABLE 6

| SAMPLES | MH (dNm) | ML (dNm) | MH − ML (dNm) | $T_{S2}$ (min) | $T_{90}$ (min) | $T_{90} - T_{S2}$ (min) | Mould fouling |
|---|---|---|---|---|---|---|---|
| EXAMPLE 1 (NBR from Latex A) | 37 | 7.75 | 29.25 | 5 | 13.5 | 8.5 | 1 |
| EXAMPLE 2 (NBR from Latex B) | 35 | 4.5 | 30.5 | 4.5 | 18.5 | 14 | 1 |
| EXAMPLE 3 (NBR from Latex C) | 34.5 | 5.5 | 29 | 5 | 14 | 9 | 1 |

From the data reported above, it can be deduced that the elastomeric compositions comprising the nitrile rubber obtained according to the present invention (Examples 1-3) have a high vulcanization rate (low $T_{90}$-$T_{S2}$ values), a good vulcanization yield (relatively high MH-ML values) and a low fouling of the moulds. In all three cases, in fact, the injection moulding could be repeated more than 50 times without observing any type of deposit or pitting attributable to fouling, either in the mould or, to an even lesser extent, in the O-rings.

Examples 4-6 (Comparative)

For comparative purpose, the crumbs of nitrile rubber obtained as described above in Examples 1-3, were subjected to a different washing. For this purpose, the crumbs of nitrile rubber coming from the coagulation of the latex (Latex A, Latex B, Latex C), were subjected to washing with deionized water at neutral pH (see Table 7 for pH values).

Table 7 indicates the following characteristics of the nitrile rubber (NBR) obtained: content of metals present (ppm), pH and ion indexes.

Table 8, on the other hand, indicates the rheometric evaluations of the elastomeric compositions obtained as described above and indicated in Table 1, comprising the nitrile rubbers obtained according to Examples 4-6 (comparative), and the classification obtained in the relative evaluation of the mould fouling.

TABLE 7

| SAMPLES | Coagulation salt | pH (washing $H_2O$) | pH (NBR obtained) | Ca (ppm) | Mg (ppm) | K (ppm) | Na (ppm) | II(1) (ppmxg/mole) | II(2) (ppmxg/mole) |
|---|---|---|---|---|---|---|---|---|---|
| EXAMPLE 4 (NBR from Latex A) | $MgSO_4$ | 8.0 | 8.5 | 37 | 466 | 120 | 8 | −0.65 | 57.6 |
| EXAMPLE 5 (NBR from Latex B) | $MgSO_4$ | 7.2 | 8.0 | 163 | 501 | 166 | 22 | 7.01 | 69.63 |
| EXAMPLE 6 (NBR from Latex C) | $MgSO_4$ | 7.5 | 7.5 | 84 | 476 | 66 | 8 | 4.25 | 63.75 |

TABLE 8

| SAMPLES | MH (dNm) | ML (dNm) | MH − ML (dNm) | $T_{S2}$ (min) | $T_{90}$ (min) | $T_{90} - T_{S2}$ (min) | Mould fouling |
|---|---|---|---|---|---|---|---|
| EXAMPLE 4 (NBR from Latex A) | 33 | 7.7 | 25.3 | 5 | 20 | 15 | 4 |
| EXAMPLE 5 (NBR from Latex B) | 31 | 4.0 | 27 | 4.0 | 23 | 19 | 4 |
| EXAMPLE 6 (NBR from Latex C) | 30 | 5.5 | 24.5 | 5.2 | 19 | 13.8 | 5 |

From the data reported above, it can be deduced that the elastomeric compositions comprising the nitrile rubber obtained after washing under neutral pH conditions (Examples 4-6 comparative) have a lower vulcanization rate (higher $T_{90}$-$T_{S2}$ values), a worst vulcanization yield (lower MH-ML values) and fouling of the moulds. In all three cases, in fact, at the end of the 50 injection moulding cycles numerous defects were observed (punctiform deposits) in both the mould and in the O-rings obtained.

Examples 7-9 (Comparative)

For comparative purpose, the latexes obtained as described above in Examples 1-3 (Latex A, Latex B, Latex C), were coagulated using 4 kg of a saturated aqueous solution of calcium chloride. The Latex A1, Latex B1 and Latex C1, thus obtained, were subsequently subjected to washing with deionized water which was brought to pH 11.5-11.6 (see Table 9 for the pH values) by the addition of potassium hydroxide (same washing indicated in Examples 1-3).

Table 9 indicates the following characteristics of the nitrile rubber (NBR) obtained: content of metals present (ppm), pH and ion indexes.

Table 10, on the other hand, indicates the rheometric evaluations of the elastomeric compositions obtained as described above and indicated in Table 1, comprising the nitrile rubbers obtained according to Examples 7-9 (comparative), and the classification obtained in the relative evaluation of the mould fouling.

in fact, already after only a few injection moulding cycles, numerous defects were observed (punctiform deposits) in both the mould and in the O-rings obtained: in no case, however, was it possible to exceed 50 moulding cycles.

The invention claimed is:

1. A process for the preparation of a nitrile rubber comprising:
    subjecting at least one α,β-unsaturated nitrile, at least one conjugated diene and, optionally, one or more further copolymerizable monomers, to emulsion polymerization, in the presence of at least one alkyl thiol containing from 12 to 16 carbon atoms and at least three tertiary carbon atoms and having the sulfur bound to one of said tertiary carbon atoms, at a pH ranging from 7 to 10, obtaining a latex;
    subjecting said latex to coagulation, in the presence of at least one metal sulfate selected from magnesium, sodium, and potassium, at a temperature higher than or equal to 30° C., obtaining a coagulated nitrile rubber; and
    subjecting said coagulated nitrile rubber to washing with water, wherein to said water is added at least one inorganic base, selected from sodium hydroxide, potassium hydroxide, calcium hydroxide, magnesium hydroxide, and lithium hydroxide, at a pH higher than or equal to 10.

2. The process for the preparation of nitrile rubber according to claim 1, wherein said emulsion polymerization is carried out at a pH ranging from 8 to 9.

TABLE 9

| SAMPLES | Coagulation salt | pH (washing H$_2$O) | pH (NBR obtained) | Ca (ppm) | Mg (ppm) | K (ppm) | Na (ppm) | II(1) (ppmxg/ mole) | II(2) (ppmxg/ mole) |
|---|---|---|---|---|---|---|---|---|---|
| EXAMPLE 7 (NBR from Latex A1) | CaCl$_2$ | 11.5 | 10.2 | 1100 | 8 | 111 | 90 | 128.25 | 128.6 |
| EXAMPLE 8 (NBR from Latex B1) | CaCl$_2$ | 11.5 | 10.6 | 990 | 5 | 88 | 107 | 127.34 | 127.97 |
| EXAMPLE 9 (NBR from Latex C1) | CaCl$_2$ | 11.6 | 10.7 | 1200 | 17 | 125 | 115 | 135.8 | 137.93 |

TABLE 10

| SAMPLES | MH (dNm) | ML (dNm) | MH − ML (dNm) | $T_{S2}$ (min) | $T_{90}$ (min) | $T_{90}$ − $T_{S2}$ (min) | Mould fouling |
|---|---|---|---|---|---|---|---|
| EXAMPLE 7 (NBR from Latex A1) | 30 | 7.75 | 22.25 | 5 | 25 | 20 | 6 |
| EXAMPLE 8 (NBR from Latex B1) | 31 | 4.5 | 26.5 | 4.75 | 29.5 | 24.75 | 6 |
| EXAMPLE 9 (NBR from Latex C1) | 31 | 7.5 | 23.5 | 5.0 | 25 | 20 | 6 |

From the data reported above, it can be deduced that the elastomeric compositions comprising the nitrile rubber obtained by subjecting the latexes to coagulation with a saturated aqueous solution of calcium chloride (Examples 7-9 comparative) have a worst vulcanization rate (higher $T_{90}$-$T_{S2}$ value), a lower vulcanization yield (lower MH-ML values) and a high fouling of the moulds. In all three cases, 3. The process for the preparation of nitrile rubber according to claim 1, wherein said coagulation is carried out in the presence of magnesium sulfate.

4. The process for the preparation of nitrile rubber according to claim 1, wherein said coagulation is carried out at a temperature ranging from 40° C. to 60° C.

5. The process for the preparation of nitrile rubber according to claim 1, wherein said washing with water is carried out in the presence of potassium hydroxide.

6. The process for the preparation of nitrile rubber according to claim 1, wherein said washing with water is carried out at a pH ranging from 11 to 12.

7. The process for the preparation of nitrile rubber according to claim 1, wherein said α,β-unsaturated nitrile is selected from α,β-unsaturated nitriles having from 3 to 5 carbon atoms.

8. The process for the preparation of nitrile rubber according to claim 1, wherein said conjugated diene is selected from conjugated dienes having from 4 to 6 carbon atoms.

9. The process for the preparation of nitrile rubber according to claim 1, wherein said nitrile rubber is an acrylonitrile-butadiene (NBR) copolymer.

10. The process for the preparation of nitrile rubber according to claim 1, wherein said one or more copolymerizable monomers are selected from α,β-unsaturated monocarboxylic or dicarboxylic acids, their esters or their amides, or mixtures thereof.

11. The process for the preparation of nitrile rubber according to claim 1, wherein said alkyl thiol is selected from: 2,2,4,6,6-pentamethylheptane-4-thiol, 2,4,4,6,6,8,8-pentamethyl-nonane-4-thiol, or mixtures thereof.

12. The process for the preparation of nitrile rubber according to claim 11, wherein said alkyl thiol is 2,2,4,6,6-pentamethylheptane-4-thiol.

13. The process for the preparation of nitrile rubber according to claim 1, wherein said alkyl thiol is a mixture comprising:

2,2,4,6,6-pentamethylheptane-4-thiol;
2,4,4,6,6-pentamethylheptane-2-thiol;
2,3,4,6,6-pentamethylheptane-2-thiol; and
2,3,4,6,6-pentamethylheptane-3-thiol.

14. The process for the preparation of nitrile rubber according to claim 1, wherein said alkyl thiol is used in an amount ranging from 0.05 parts by weight to 3 parts by weight per 100 parts by weight of the mixture of polymerization monomers.

15. The process for the preparation of nitrile rubber according to claim 1, wherein said metal sulfate is present in the latex in an amount ranging from 0.5 phr to 200 phr.

16. The process for the preparation of nitrile rubber according to claim 1, wherein the latex obtained from the polymerization has a concentration of solids ranging from 1% by weight to 40% by weight with respect to the total weight of the latex.

17. The process for the preparation of nitrile rubber according to claim 1, wherein said washing with water is carried out at a temperature ranging from 35° C. to 90° C.

18. The process for the preparation of nitrile rubber according to claim 1, wherein the amount of water used in said washing with water ranges from 0.5 phr to 20 phr.

19. A vulcanizable elastomeric composition comprising at least one nitrile rubber obtained according to claim 1 and at least one vulcanizing agent.

20. A method comprising:
    injection moulding a vulcanizable elastomeric composition according to claim 19.

* * * * *